United States Patent
Nitsuma (10) Patent No.: US 8,714,654 B2
(45) Date of Patent: May 6, 2014

(54) VEHICLE SEAT

(75) Inventor: Kenichi Nitsuma, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 315 days.

(21) Appl. No.: 13/121,750

(22) PCT Filed: Sep. 28, 2009

(86) PCT No.: PCT/JP2009/066773
§ 371 (c)(1),
(2), (4) Date: Mar. 30, 2011

(87) PCT Pub. No.: WO2010/038699
PCT Pub. Date: Apr. 8, 2010

(65) Prior Publication Data
US 2011/0204693 A1    Aug. 25, 2011

(30) Foreign Application Priority Data

Sep. 30, 2008   (JP) ................................ 2008-253156
Sep. 30, 2008   (JP) ................................ 2008-253157

(51) Int. Cl.
*B60N 2/68* (2006.01)

(52) U.S. Cl.
USPC .................................. 297/452.35; 297/452.2

(58) Field of Classification Search
USPC ................ 297/452.18, 452.2, 452.34, 452.35
See application file for complete search history.

(56) References Cited

U.S. PATENT DOCUMENTS

| | | | | |
|---|---|---|---|---|
| 3,874,731 A | * | 4/1975 | Jordan | 297/452.52 |
| 4,747,638 A | * | 5/1988 | Saito | 297/452.62 |
| 5,253,924 A | * | 10/1993 | Glance | 297/452.1 |
| 5,499,863 A | * | 3/1996 | Nakane et al. | 297/452.2 |
| 5,567,017 A | * | 10/1996 | Bourgeois et al. | 297/452.2 |
| 5,660,443 A | * | 8/1997 | Pedronno | 297/452.2 |
| 5,988,756 A | * | 11/1999 | Aufrere et al. | 297/452.18 |
| 6,322,148 B1 | * | 11/2001 | Kolena et al. | 297/452.2 |
| 8,313,140 B2 | * | 11/2012 | Niitsuma et al. | 297/216.12 |
| 2005/0168041 A1 | * | 8/2005 | Glance et al. | 297/452.18 |
| 2005/0179306 A1 | * | 8/2005 | White et al. | 297/452.33 |

FOREIGN PATENT DOCUMENTS

| | | |
|---|---|---|
| JP | 59-136337 U | 9/1984 |
| JP | 09-132102 A | 5/1997 |
| JP | 09-240334 A | 9/1997 |
| JP | 2002-337585 A | 11/2002 |
| JP | 2003-341402 A | 12/2003 |
| JP | 2005-028956 A | 2/2005 |

* cited by examiner

*Primary Examiner* — Peter Brown (74) *Attorney, Agent, or Firm* — Drinker Biddle & Reath LLP (57) ABSTRACT

A vehicle seat has a seatback frame forming a seatback of a vehicle seat that comprises a pair of side frame sections composed of pipe shaped members at least in part, separated from each other in a lateral direction, and extended in a vertical direction, and comprises an upper frame for interconnecting upper sides of the pair of side frame sections. Flat sections each deformed outward in the lateral direction to reduce the lateral thickness thereof are formed in portions of the pair of side frame sections where their respective pipe shaped members are opposed to each other. Thus, the distance between the pair of side frame sections can be increased without changing lateral dimensions of the seatback frame, allowing an occupant to more smoothly sink into the seatback from the backrest front surface.

5 Claims, 7 Drawing Sheets

VEHICLE SEAT

CROSS REFERENCE TO RELATED APPLICATIONS

This application is the U.S. national phase of the International Patent Application No. PCT/JP2009/066773, filed Sep. 28, 2009, which claims the benefit of Japanese Patent Application No. 2008-253156, filed Sep. 30, 2008, and Japanese Patent Application No. 2008-253157, filed Sep. 30, 2008, the entire content of which is incorporated herein by reference.

BACKGROUND

The present invention relates to a vehicle seat, particularly to a vehicle seat designed to reduce an impact which is applied to a neck of an occupant when a vehicle is collided from behind.

Conventionally, at the time of a so-called rear collision, such as when an automobile is collided from behind, or when the automobile is collided while rolling backward, there is a risk that the head of a seated occupant is abruptly tilted backward due to inertial motion, thereby causing the neck of the occupant to receive an impact.

For this reason, in order to protect the head or the neck of the occupant against the impact exerted by the rear collision and reduce the impact applied to the neck, a seat in a vehicle such as an automobile is equipped at an upper part of a seat back with a headrest for receiving the head of the occupant from behind. Although the headrest is able to significantly reduce the impact which is applied to the neck when the vehicle is collided from behind, it is still desired to further reduce the impact applied to the neck.

In view of overcoming such a problem, there has been suggested a seat back designed to reduce the impact applied to the neck, in which an occupant is moved rearward at the time of a rear collision, so that a headrest can be moved forward by a moving load, to support the head of the occupant (refer to Japanese Patent Application Publication No. 2003-341402 ("the '402 Publication"), for example).

On the other hand, there has been known a technique that, in a vehicle seat providing a seat back in which a cushion material is disposed on a front side of a seat back frame, a portion of a seat back where a chest region of an occupant comes into contact with the seat back when a rear-end collision occurs is defined to have a smaller spring modulus and to have a greater damping coefficient than those of the other portion of the seat back (refer to Japanese Patent Application Publication No. 2005-028956 ("the '956 Publication"), for example).

In the technique disclosed in the above '402 Publication, backward movement of the chest region of the occupant is received by a pressure receiving member, while the headrest is caused to move forward in conjunction with the backward movement of the pressure receiving member. This requires a separately installed mechanism for moving the headrest, which is disadvantageous in that costs are increased and that it prevents reduction of thickness of the seat back.

In the technique disclosed in the '956 Publication, the portion of the seat back contacted by the chest region is composed of a cushion material having both a lower modulus of elasticity and a lower repulsive elasticity than those of a cushion material for the other portion in order to suppress a rebound of the chest region and decrease a relative speed between the head and the chest region in view of softening the impact applied to the neck. However, because the seat cushion is composed of a combination of multiple types of cushion materials which differ in repulsive elasticity, the technique has a disadvantage of cost increase. Further, there is another disadvantage in that it is difficult to reduce the thickness of the seat back because the cushion material of low repulsive elasticity having a certain extent of thickness should be used to sufficiently suppress the rebound of the chest region.

In view of the above-described problems, various embodiments of the present invention are directed to provide a vehicle seat capable of efficiently reducing an impact which is applied to the neck of an occupant at the time of a rear collision while maintaining a structure suitable for reducing cost and thickness.

According to an embodiment, the problems set forth above are solved by a vehicle seat comprising a seat back and a headrest attached to the seat back, in which the seat back comprises a seat back frame providing a pair of side frame sections composed of pipe shaped members at least in part, spaced apart from each other in a lateral direction, and extended in a vertical direction, and providing an upper frame for coupling upper sides of the pair of side frame sections, and the seat back further comprises a cushion material disposed at least on a front side of the seat back frame. Further, in the vehicle seat, each of the pair of the side frame sections provides a flat section obtained by deforming a region of one of the pipe shaped members opposed to the other pipe shaped member to reduce a thickness of the side frame section, a core cavity section formed by removing a portion of the cushion material opposed to the side frame section is formed in a region of the cushion material located on a front side of the side frame section, and a thickness of a region of the cushion material in which the core cavity section is formed is smaller than a thickness of another region of the cushion material for supporting a back of an occupant who is seated on the vehicle seat.

According to the above-described structure, because the flat section is formed by deforming in the region of the side frame section where the pipe shaped members are opposed to each other in order to reduce the thickness of the side frame section, areas protruded from the right and left side frame sections to a direction along which the side frame sections are opposed to each other can be removed, to broaden a distance between the pair of side frame sections in an area where the occupant has a greater lateral width without changing external dimensions of the seat back frame in the lateral direction. In this manner, interference from the right and left side frame sections that hinders the occupant from moving rearward when the occupant sinks into the seat back is suppressed, which allows the occupant to more smoothly sink into the seat back from the backrest front surface. Accordingly, quick approach of the head of the occupant to the headrest at the time of the rear collision is realized, and the impact applied to the neck is effectively reduced.

In addition, because sinking motion of the occupant at the time of the rear collision can be ensured only by shaping the side frame section, without necessity to install a separate mechanism such as a headrest shifting mechanism and without involving an increase in the number of parts, both cost and thickness can be reduced in the vehicle seat capable of softening the impact which will be applied to the neck when the vehicle is collided from behind.

It is preferable that the cushion material has a core cavity section obtained by partially removing the cushion material in a region of the cushion material located on the front side of the side frame section and opposed to the side frame section.

As such, by forming the core cavity section, a thickness of the cushion material is reduced in a region where the cushion material is deformed through physical contact with the flat section while the occupant is sinking into the vehicle seat, to facilitate deformation of the cushion material without deteriorating a proper seated feeling during normal use. It is therefore possible to effectively reduce resistance to deformation of the cushion material. In this way, smoother sinking of the occupant into the seat back from the backrest front surface is realized without involving an increase in the number of parts. Moreover, the formation of the core cavity section can contribute to further reduction of the thickness. Therefore, while maintaining low cost and thin profile, the head of the occupant can be immediately moved closer to the headrest at the time of the rear collision, to achieve more effective reduction of the impact applied to the neck.

In the above-described structure, the flat section is preferably formed at least in a place corresponding to a chest region or a shoulder region of the occupant who is seated on the vehicle seat. With this configuration, the distance between the pair of the side frame sections can be increased in an area corresponding to a part of the occupant having a greater lateral body width, without changing external dimensions of the seat back frame in the lateral direction.

Further, in an embodiment, the core cavity section is preferably formed at least in an area opposed to the region where the flat section of the side frame section is formed.

In this way, when the core cavity section is formed in the area of the cushion material opposed to the region where the flat section of the side frame section is formed, the cushion material can be formed thinly in the region of the cushion material deformed through physical contact with the flat section of the side frame section, to facilitate deformation of the cushion material. Accordingly, the resistance to deformation of the cushion material can be reduced in an effective manner. This allows the occupant to more smoothly sink into the seat back from the backrest front surface. Thus, the head of the occupant can immediately be moved closer to the headrest at the time of the rear collision, to effectively reduce the impact applied to the neck.

Moreover, in an embodiment, the flat sections are preferably angled toward mutually opposite directions relative to a back and front direction of the vehicle seat in such a manner that a distance between front ends of the opposing flat sections becomes greater than a distance between back ends of the opposing flat sections.

According to the above configuration, with the flat section formed along the shape of the back of the occupant, a distance between the back of the occupant and the side frame section can relatively be extended without greatly changing the structure of the seat back frame. In addition, because variations of the distance between the back of the occupant and the side frame section that vary by location can be suppressed, the cushion material is relatively uniformly deformed rearward during sinking motion. So, a partial increase of the resistance to deformation can be prevented. As a result, the interference from the side frame sections that hinders the occupant from moving rearward is further relieved to allow the occupant to more smoothly sink into the seat back from the backrest front surface. Thus, the head of the occupant can immediately be moved closer to the headrest at the time of the rear collision, and the impact applied to the neck can accordingly be reduced in an effective manner at low cost.

According to embodiments of the vehicle seat described above, the impact applied to the neck is effectively reduced because smoother sinking of the occupant into the seat back from the backrest front surface when the vehicle is collided from behind is realized and thereby the gap between the head of the occupant and the headrest is quickly minimized. In addition, it is also possible to effectively reduce the impact applied to the neck of the occupant at the time of the rear collision while maintaining the structure suitable for reducing the cost and the thickness.

Further in addition to allowing the occupant to more smoothly sink into the seat back from the backrest front surface, low cost and further reduction in thickness can be achieved without deteriorating a proper seated feeling during normal use.

Moreover, according to embodiments of the vehicle seat described above, resistance to deformation of the cushion material can be made relatively uniform during sinking motion, which allows the occupant to more smoothly sink into the seat back from the backrest front surface without greatly changing a configuration of the seat back frame.

BRIEF DESCRIPTION OF THE DRAWINGS

The invention is described with reference to various embodiments illustrated in the following drawings.

DETAILED DESCRIPTION

Hereinafter, various embodiments of the present invention will be described with reference to the drawings. Members, arrangement, and the like do not limit the present invention but, as a matter of course, can variously be modified along the gist of the present invention.

First Embodiment

FIGS. 1 to 5 show a first embodiment of the present invention.

Figure 1:
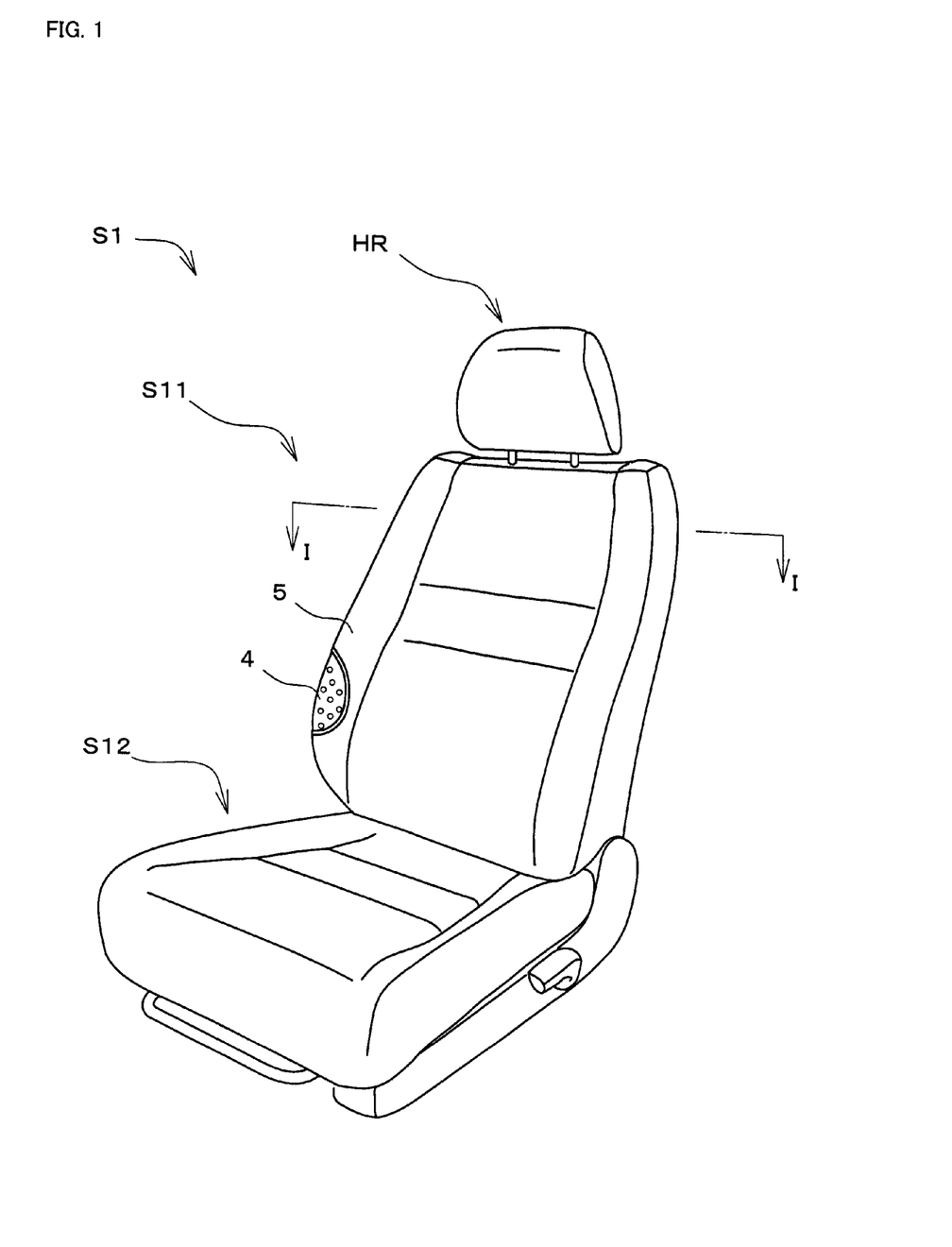
FIG. 1 is a schematic perspective view showing a vehicle seat according to a first embodiment of the present invention.

As shown in FIG. 1, a vehicle seat S1 according to this embodiment is configured with main component members providing a seat back S11, a seat cushion S12, and a headrest HR.

Figure 2:
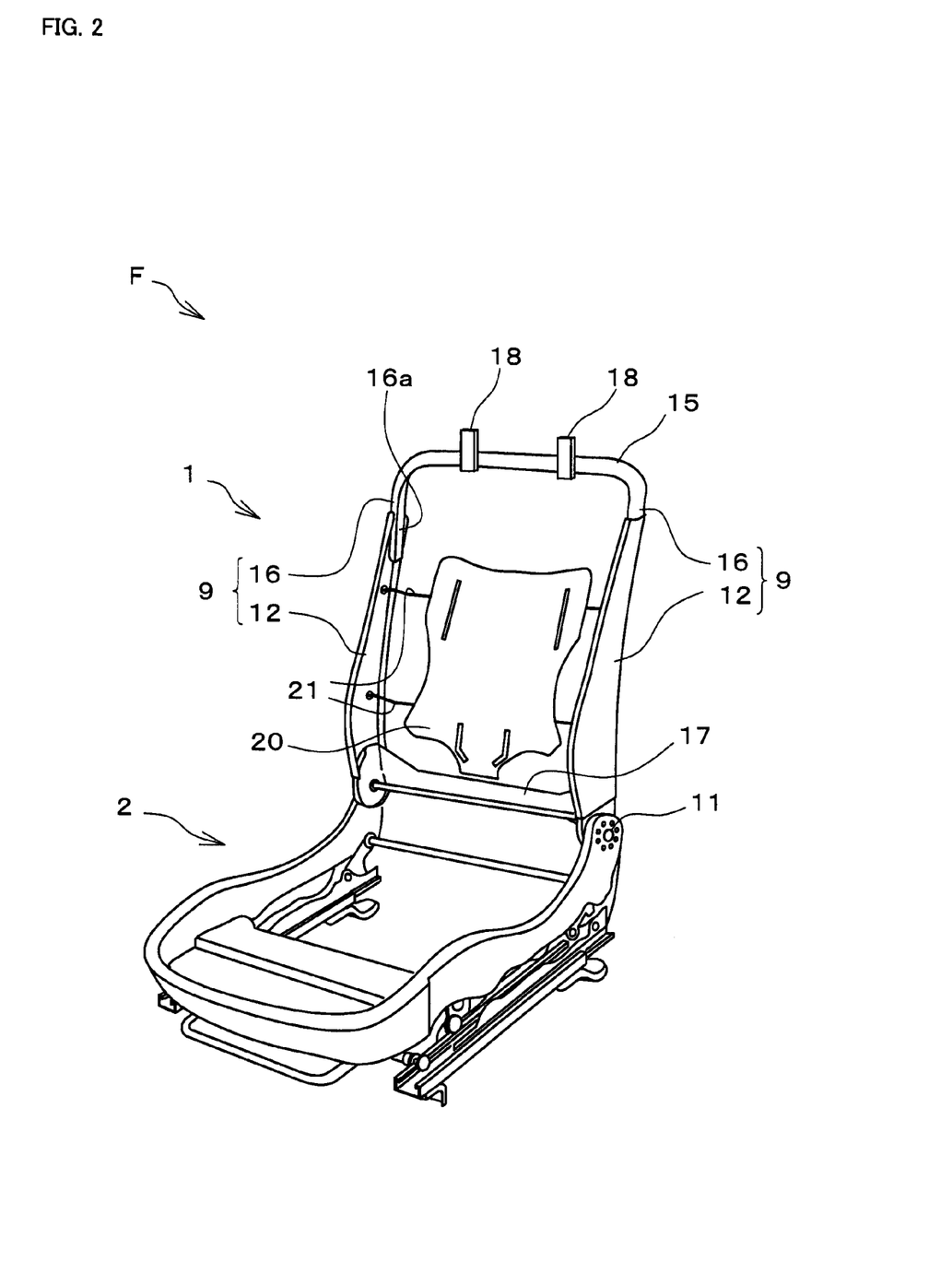
FIG. 2 is a schematic perspective view showing a seat frame of the vehicle seat according to the first embodiment of the present invention.

As shown in FIG. 2, a seat frame F of the vehicle seat S1 provides, as main components, a seat back frame 1 forming the seat back S11, a seating frame 2 forming the seat cushion S12, and a headrest frame (not illustrated) forming the headrest HR. In the following description of the vehicle seat S1, a region where the headrest HR is placed is defined as an upper side while a seat cushion S12 side is defined as a lower side.

The seating frame 2 is covered with a cushion material 4 or the like, and has a structure for supporting an occupant C from below. The seating frame 2 is supported by a leg section to which not-illustrated inner rails are attached, and the seating frame 2 is assembled in such a slidable way that its position can be adjusted back and forth relative to outer rails (not illustrated) and inner rails mounted on a vehicle floor. Further, the seat back frame 1 is disposed via a reclining mechanism 11 on a rear end part of the seating frame 2.

The seat back frame 1, which is covered with the cushion material 4 and a skin material 5, functions to support a back of the occupant C from behind, and in this embodiment, it is formed into a frame body in a substantially rectangular shape. More specifically, the seat back frame 1 provides two side frames 12, 12 which are laterally spaced apart from each other and vertically extended, an upper frame 15 for coupling upper ends of the side frames 12, 12, a lower frame 17 for coupling lower ends of the side frames 12, 12, and a pressure receiving member 20.

Moreover, a headrest frame which is not illustrated is disposed on a top of the seat back frame 1. Then, the headrest HR is constructed by providing the cushion material 4 to an outer peripheral part of the headrest frame and covering an outer periphery of the cushion material 4 with a surface member. The headrest HR is installed by attaching pillars on the headrest frame to a pillar supporting sections 18, 18 disposed on the top frame 15.

The side frames 12, 12 are constructed as a pair of extended members for constituting right and left side surfaces of the seat back frame 1, and spaced apart from each other in a lateral direction, while having a predetermined length in a vertical direction. Each side frame 12, 12 obtains a required level of strength by bending front and rear ends of its side plate shaped into a vertically extended flat sheet, inwardly relative to the seat back S11.

The upper frame 15 is a member formed by bending a pipe shaped member into a substantially squared U shape. Side sections 16, 16, which are continuously extended downward from both ends of a horizontal part of the upper frame 15 in a manner that they are disposed on both sides of the upper frame 15, are partially overlapped with the side frames 12, 12. In thus-overlapped regions, the side sections 16, 16 are adhered and joined to the side frames 12, 12. The side sections 16, 16 of the upper frame 15 provide flat sections 16a, 16a, each of which is formed by substantially flattening a portion of right or left side section 16 opposed to the other side section 16. The flat sections 16a, 16a will be described further below. Although the upper frame 15 is composed of the pipe shaped member in this embodiment, a rod shaped member may be used for the upper frame 15.

In this embodiment, both the side frames 12, 12 and the side sections 16, 16 constituting side surfaces of the seat back frame 1 are defined as side frame sections 9, 9.

The pressure receiving member 20 functioning as a posture retaining member to support the cushion material 4 from behind is disposed between the right and left side frames 12, 12. The pressure receiving member 20 is a flexible member obtained by forming plate type resin into a substantially rectangular shape, and a surface of the pressure receiving member 20 has smooth asperities formed on a side making contact with the cushion material 4.

Two wires 21, 21 are suspended between the right and left side frames 12, 12 as a coupling member for supportingly connecting the pressure receiving member 20 to the side frames 12, 12. The wires 21, 21 are laterally suspended and secured to upper and lower parts of a backside of the pressure receiving member 20, to support the pressure receiving member 20 in parallel on a back surface of the cushion material 4. The wires 21, 21 composed of bent steel wire rods can be deformed to absorb an impact when a stress of a predetermined value or greater is exerted on the pressure receiving member 20.

Next, a cross-sectional structure of the seat back S11 according to this embodiment will be described with reference to FIGS. 3 and 4. Note that the skin material 5 is not illustrated in FIGS. 3 and 4 in order to avoid complicating the drawings.

Figure 3:
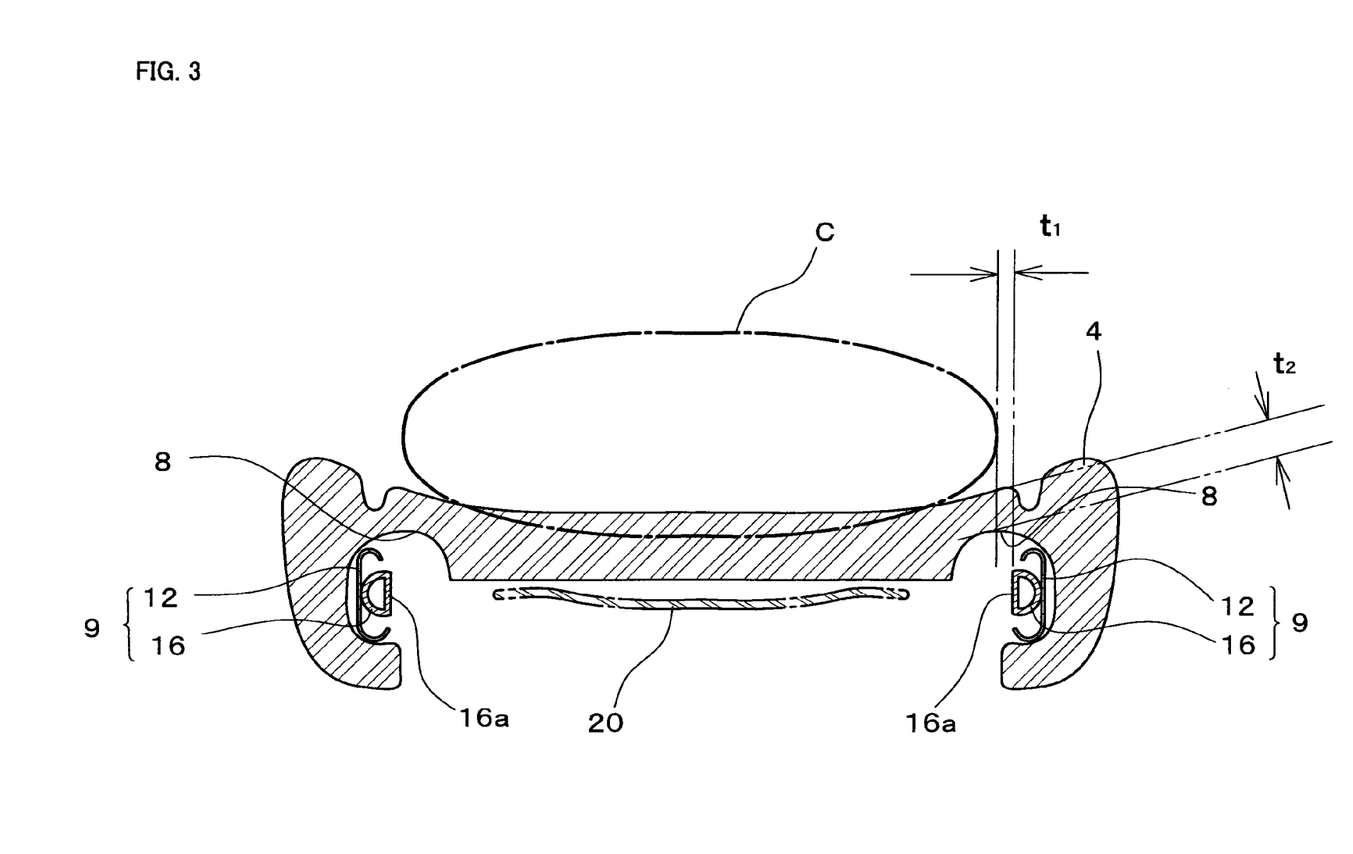
FIG. 3 is a cross-sectional diagram showing a cross section I-I of a seat back according to the first embodiment of the present invention.
Figure 4:
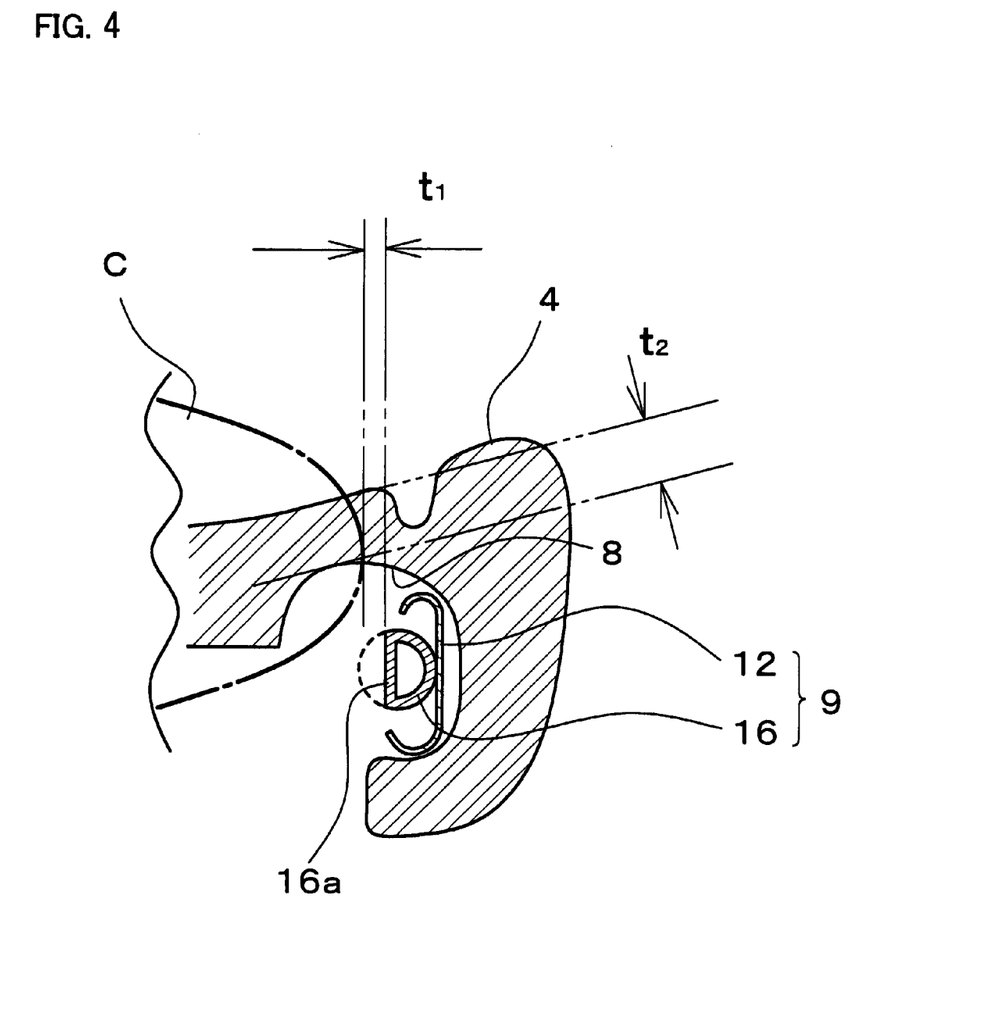
FIG. 4 is an enlarged explanatory cross-sectional diagram showing a cross-sectional structure of the seat back according to the first embodiment of the present invention and a location into which an occupant sinks.

As shown in FIG. 3, the side sections 16, 16 of the upper frame 15 disposed to overlap with the side frames 12, 12 provide the flat sections 16a, 16a being formed by flattening the portion of the side sections 16, 16 facing each other. In the portion formed as the flat section 16a, a cross section of the pipe shaped member is substantially flattened in part to be formed into a substantially semicircular hollow shape in cross section. Formation of the flat sections 16a, 16a omits areas protruded from the right and left side frames 12, 12 to a direction in which they are opposed to each other, and thereby a distance between the side sections 16, 16 can be extended without changing external dimensions of the seat back frame 1 in the lateral direction.

In this embodiment, the flat sections 16a, 16a are formed into a flat shape, but a similar effect can be obtained by deforming these portions into an inwardly depressed shape inside the side sections 16, 16.

When the occupant C sinks into the seat back S11 at the time such as when the rear collision occurs, the cushion material 4 located on both sides of an area depressed by a sinking motion of the occupant C is compressed, or otherwise, experiences tensile or shear deformation, and resistance to such deformation (deformation resistance) functions as resistance to sinking motion of the occupant C. When the distance between the side sections 16, 16 is broadened, a stress acting on the cushion material 4 located on both sides of the depressed area can be reduced during the sinking motion and thereby the deformation resistance is reduced.

Specifically, when a depressable width of the seat back S11 is broadened relative to a lateral width of the occupant C, to thereby increase a clearance $t_1$ between each inner side of the side frame sections 9, 9 and the occupant C, the resistance acting on the occupant C at the time of sinking into the seat back S11 from the backrest front surface can be reduced to allow the occupant to sink more smoothly into the seat back S11. At this time, the back of the occupant C is shifted backward through sinking motion into the seat back S11, but a position of the headrest HR relative to the seat back S11 remains unchanged. As a result, a gap between the headrest HR and the head can be reduced, and the impact applied to the neck is effectively reduced.

Here, the backrest front surface refers to a surface of the seat back S11 against which the occupant C leans when seated. Thus, a backrest front surface side of the occupant C denotes a rear side of the occupant C, whereas a backrest front surface side of the seat back frame 1 denotes a front side of the seat back frame 1.

In particular, the side sections 16, 16 are located in the vicinity of a place corresponding to the chest region or the shoulder region of the occupant C when the occupant C is seated on the vehicle seat S1, and positioned inside the side frames 12, 12. For this reason, a distance between the side sections 16, 16 is smaller than a distance between the side frames 12, 12. Accordingly, the cushion material 4 located in the vicinity of the side sections 16, 16 tends to exhibit a higher resistance to deformation. The resistance to deformation of the cushion material 4 can be effectively reduced by forming the substantially flat sections 16a, 16a at inner sides of the side sections 16, 16 substantially flat, and by increasing the clearance $t_1$ between the inner sides of the side sections 16, 16 and the occupant C. As a result, smoother sinking of the occupant C into the seat back S11 is realized. In addition, when an amount of sinking is increased in the vicinity of the chest region or the shoulder region where the occupant C has a great lateral width, the gap between the headrest HR and the head can efficiently be narrowed, and thereby the impact applied to the neck is effectively reduced.

On the other hand, the cushion material 4 provided in the seat back S11 is formed of urethane material, and disposed to cover a backrest front surface side as well as both right and left side of the seat back frame 1.

In the cushion material 4 provided to the seat back S11, core cavity sections 8, 8 are formed in regions located on the backrest front surface side of the side frames 12, 12 and the side sections 16, 16, i.e. regions (hereinafter referred to as "deformation resistance region") located on the backrest front surface side of the side frame sections 9, 9 in order to reduce a thickness $t_2$ of the cushion material 4. In this regard, the thickness $t_2$ of the cushion material 4 is smaller than that of the cushion material 4 located on the backrest front surface, that is, the region against which the occupant C leans when seated, but has sufficient thickness to ensure necessary durability to the cushion material 4.

Here, the deformation resistance region refers to a region which is strongly pushed toward the side frame sections 9, 9 of the seat back frame 1 when the occupant C sinks into the seat back S11 at the time such as when the rear collision occurs. The resistance to deformation of the cushion material 4 in the deformation resistance region functions as a resistance to sinking motion of the occupant C. Therefore, the resistance to deformation can be reduced by partially removing the cushion material 4 located in the deformation resistance region. That is to say, by forming the core cavity section 8, 8 in which the cushion material 4 is partially removed on a side facing the side frame sections 9, 9, smoother sinking of the occupant C into the seat back S11 from the backrest front surface is realized and thereby the gap between the headrest HR and the head is reduced. As a result, the impact applied to the neck can be softened in an effective manner.

In particular, the side sections 16, 16 located in the vicinity of the place corresponding to the chest region or the shoulder region of the occupant C are narrower in a distance therebetween as compared to the distance between the side frames 12, 12. For this reason, the formation of the core cavity sections 8, 8 in the region of the cushion material 4 close to the side sections 16, 16 enables more effective reduction of the resistance to deformation of the cushion material 4, and in turn, allows the occupant C to more smoothly sink into the backrest front surface. In addition, because the formation of the core cavity sections 8, 8 in the cushion material 4 provides a great effect it is possible to reduce effectively the impact applied to the neck at lower cost.

In this embodiment, the core cavity sections 8, 8 are formed on the backrest front surface side of the flat sections 16a, 16a. The distance between the side sections 16, 16 is broadened by way of the flat sections 16a, 16a for securing the clearance $t_1$ between the inner side of the side frame section 9 and the occupant C, to thereby facilitate the deformation of the cushion material 4. Moreover, the thickness $t_2$ of the cushion material 4 in the region to be deformed at the time of the sinking is formed thinly by way of the core cavity sections 8, 8, to thereby further facilitate the deformation of the cushion material 4. When all of the above configurations are established, the resistance to deformation of the cushion material 4 can greatly be decreased, and allow the occupant C to more smoothly sink into the seat back S11 from the backrest front surface.

Note that although both the flat sections 16a, 16a and the core cavity sections 8, 8 are formed in this embodiment, a structure providing either the flat sections 16a, 16a or the core cavity sections 8, 8 has similar effects in either case. Further, even in a structure providing only the core cavity sections 8, 8, the structure can provide the similar effect of securing the distance between the side frame sections 9, 9 and the cushion material 4 to thereby facilitate the deformation of the cushion material 4.

According to the vehicle seat S1 of this embodiment as described above, through provision of the flat sections 16a, 16a at the positions where the right and left side frame sections 9, 9 are opposed to each other, the distance between the side sections 16, 16 can be broadened without changing the external dimensions of the seat back frame 1 in the lateral direction. As a result, the clearance $t_1$ between the inner side of the side frame 12, 12 and the occupant C is increased, and it allows the occupant C to more smoothly sink into the seat back S11 from the backrest front surface. Thus, the gap between the head of the occupant C and the headrest can quickly be minimized when the rear collision occurs, and the impact applied to the neck is effectively reduced without using an active headrest mechanism.

In the cushion material 4 provided to the seat back S11, when the core cavity sections 8, 8 are formed in the region located on the backrest front surface side of the side frames 12, 12 or the side sections 16, 16, the resistance to deformation can be reduced and thereby smoother sinking of the occupant C into the seat back S11 from the backrest front surface is realized. The gap between the head of the occupant C and the headrest HR can be immediately reduced at the time of the rear collision through the core cavity sections 8, 8, and thereby the impact applied to the neck can effectively be reduced without using the active headrest mechanism. Further, because the core cavity sections 8, 8 are formed on both right and left sides of the backrest front surface, the thickness of the cushion material 4 in the central part of the backrest front surface is ensured and thereby a proper seated feeling is maintained. Still further, concentration of stress to a deformed portion of the cushion material 4 can be relieved by forming the core cavity sections 8, 8 in a strong stress acting area of the cushion material 4, and durability of the cushion material 4 is improved.

Because conventional techniques may be used for formation of both the flat sections 16a, 16a and the core cavity sections 8, 8, they may be formed at low cost. In addition, the impact applied to the neck of the occupant C at the time of the rear collision can be reduced by way of a simple structure without installing separate components or complicated mechanisms, and thus it is possible to make the vehicle seat S1 thinner. Accordingly, flexibility in layout and a degree of freedom in design can be improved.

In the flat sections 16a, 16a provided to the side frame sections according to the above-described first embodiment, a structure is employed in which an internal distance between a pair of the side sections 16, 16 is broadened by flattening the opposed portions of the pair of side sections 16, 16. However, the flat sections 16a, 16a are not limited to the above structure, and the other structures may be employed.

Figure 5:
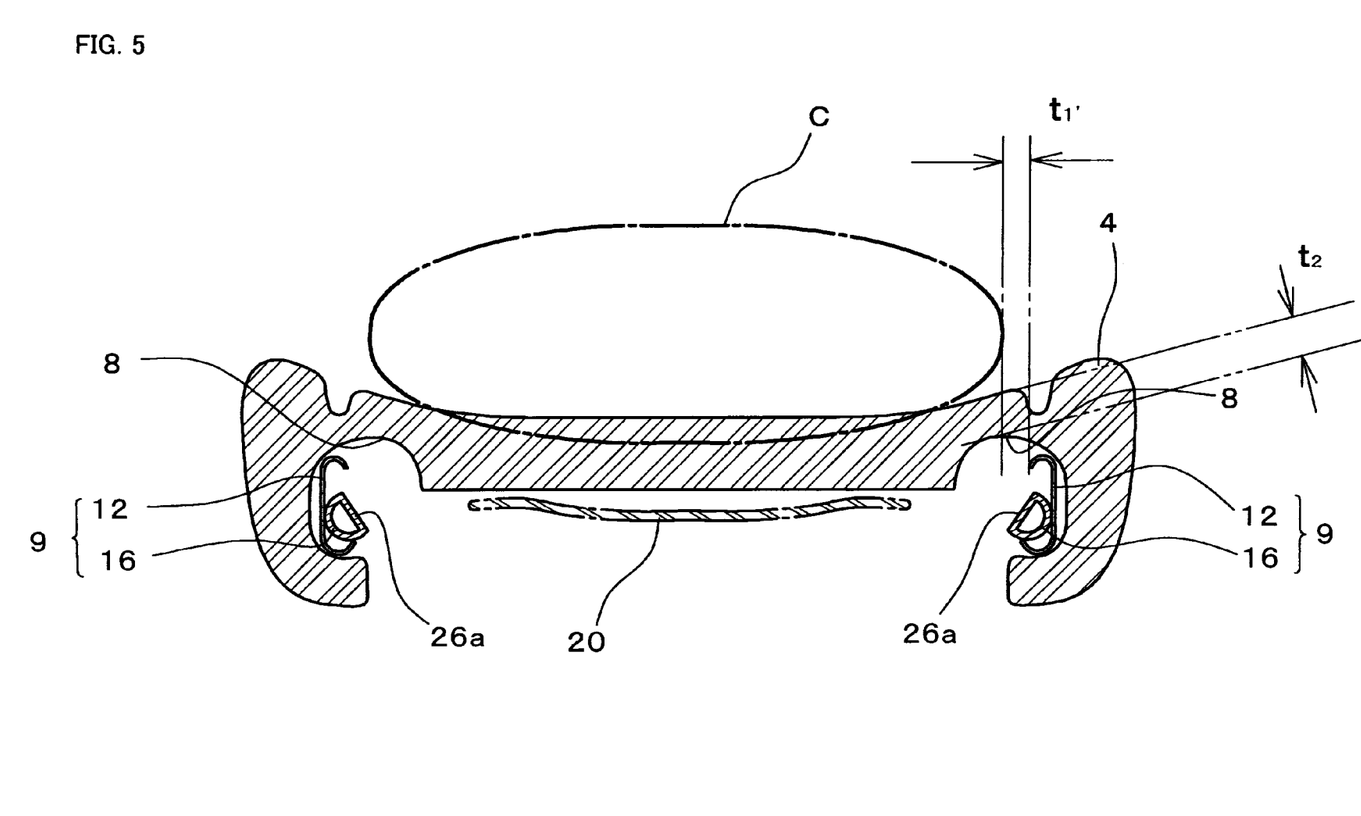
FIG. 5 is a cross-sectional diagram showing a cross section I-I of another exemplary seat back according to the first embodiment of the present invention.

FIG. 5 shows another example of a drawing of the cross section I-I of the seat back in which flat sections 26a, 26a having a structure different from that of the above-described example. Note that the skin material 5 is also omitted in FIG. 5 to avoid complicating the drawing, as in the case of FIGS. 3 and 4.

The opposing flat sections 26a, 26a are respectively tilted along directions opposite to each other to broaden a distance between the flat sections 26a, 26a toward the occupant C. In other words, the flat sections 26a, 26a are constructed by partially flattening the side sections 16, 16 along with a shape of the back of the occupant C in a position of sinking into the seat back S1. The side sections 16, 16 providing the flat sections 26a, 26a are placed rearward relative to a position of the side frames 12, 12 in a back and forth direction. The flat sections 26a, 26a formed in this way facilitate further reduction of the resistance to sinking motion of the occupant C. In particular, a greater effect can be expected by forming the flat sections 26a, 26a at the place corresponding to the chest region or the shoulder region of the occupant who is seated on the vehicle seat S1.

By forming the flat sections 26a, 26a along the shape of the back of the occupant, the distance between the back of the occupant and the side sections 16, 16 can relatively be broadened without making substantial changes to the construction of the seat back frame 1, and, at the same time, the clearance ($t_1$) between each inner side of the side sections 16, 16 and the occupant C in an initial state of sinking motion can further be broadened. Additionally, the tilt of the flat sections 26a, 26a guides the occupant to an appropriate position of the seat back during sinking motion. Furthermore, variations of the distance between the back of the occupant and the side sections 16, 16 that vary by location can be suppressed, and thus the resistance to deformation from partially increasing in the cushion material 4 side during sinking motion is prevented. The resistance of the side sections 16, 16 (the side frame sections 9, 9) to rearward travel of the occupant is further reduced by the above-described functions and effects, and smoother sinking of the occupant into the seat back S11 from the backrest front surface is realized. Accordingly, when the vehicle is collided from behind, the impact applied to the neck can effectively be reduced at low cost by immediately moving the head of the occupant closer to the headrest HR.

Second Embodiment

Figure 6:
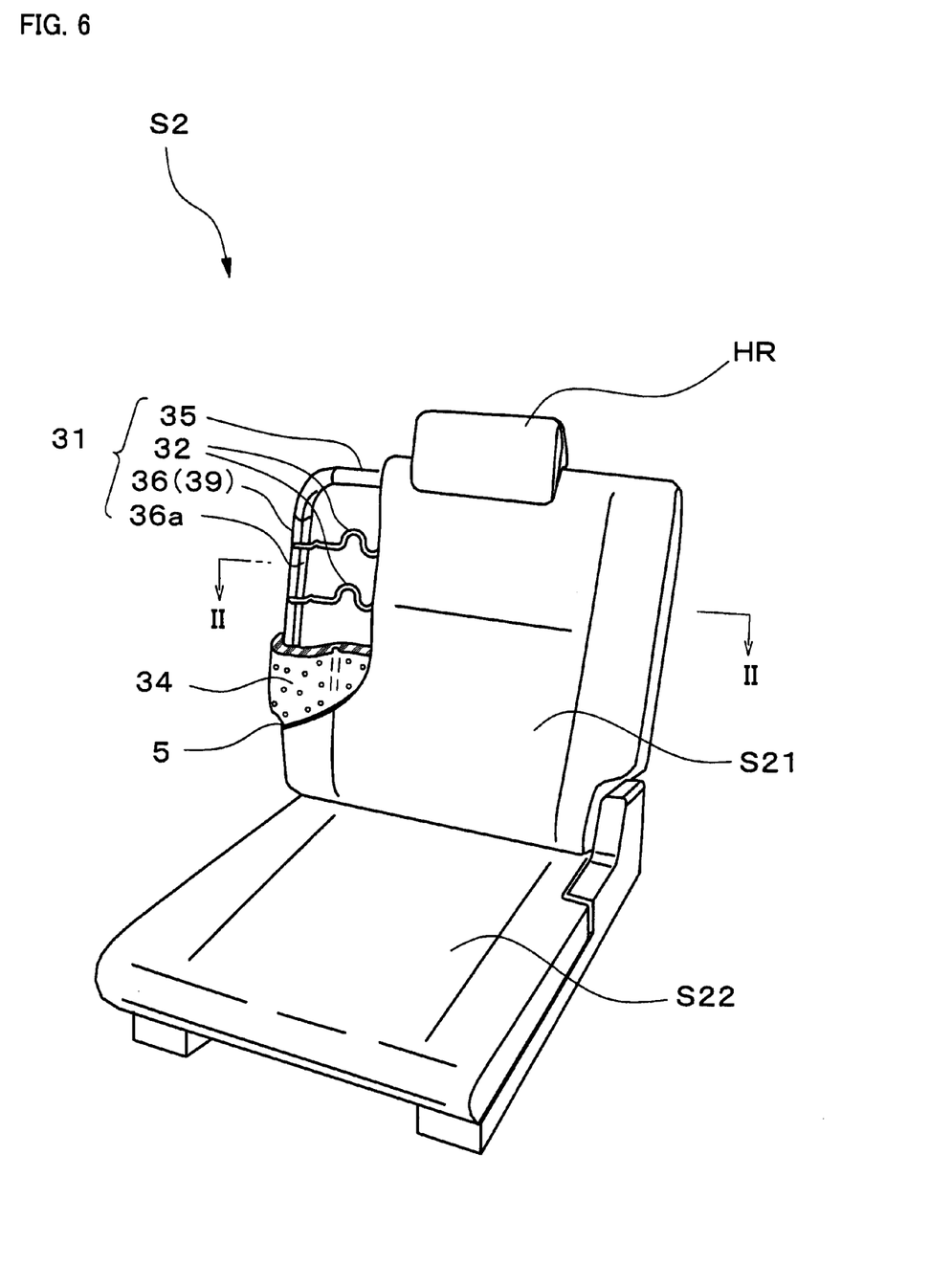
FIG. 6 is a partial perspective view of a vehicle seat according to a second embodiment of the present invention.
Figure 7:
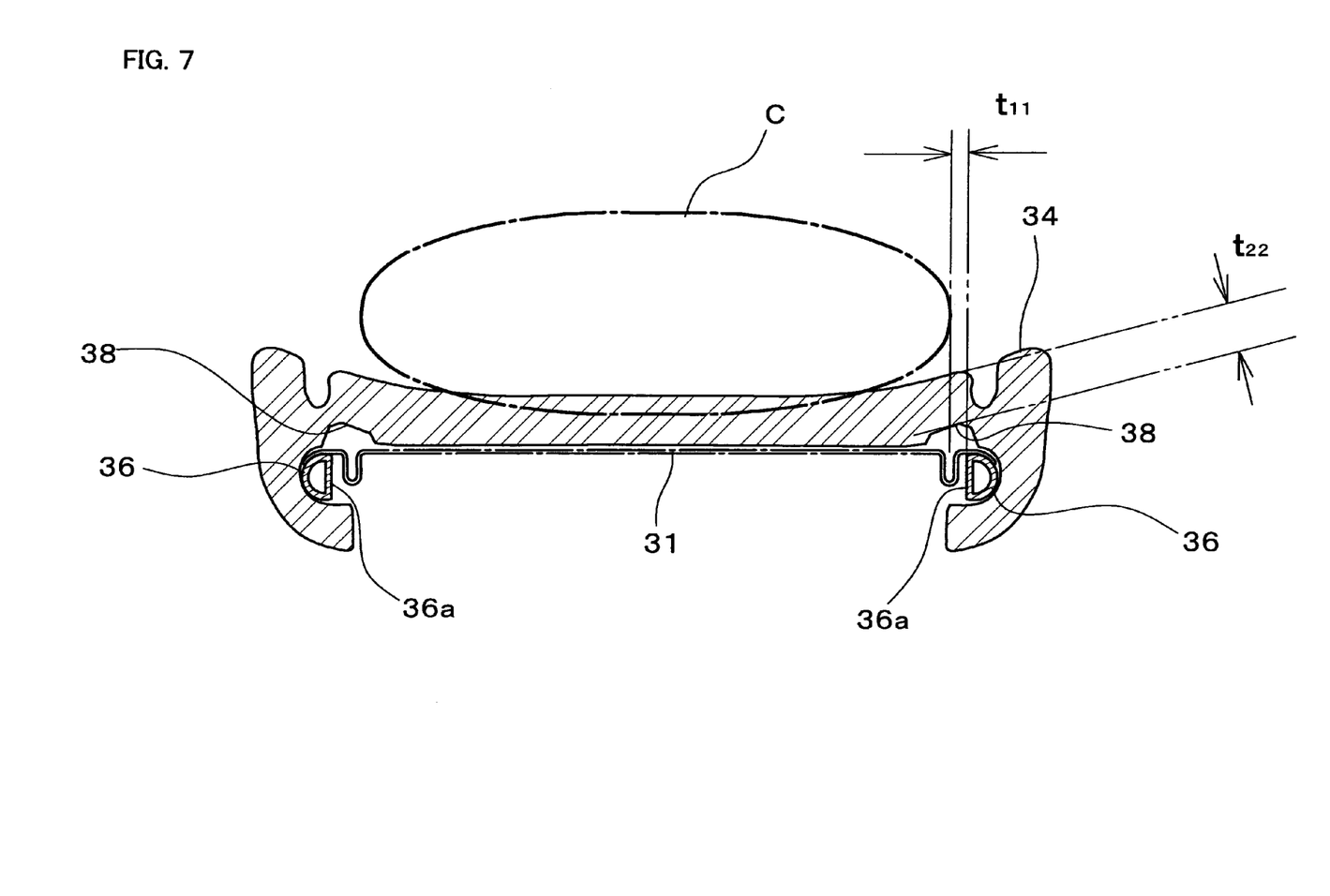
FIG. 7 is a cross-sectional diagram showing a cross section II-II of a seat back according to the second embodiment of the present invention.

FIGS. 6 and 7 show a second embodiment according to the present invention. FIG. 6 is a partial perspective view of a vehicle seat S2, and FIG. 7 is a diagram of a cross-section II-II of the seat back S21. The skin material 5 is omitted in FIG. 7 to avoid complicating the drawing.

Further, in each embodiment below, components, arrangement, etc. similar to those in the first embodiment are designated by the same reference numerals as those of the first embodiment, and the descriptions related to the components, arrangements, etc. will not be repeated.

As shown in FIG. 6, the vehicle seat S2 according to this embodiment provides, as main components, a seat back S21, a seat cushion S22, the headrest HR. In addition, the vehicle seat S2 is configured as a stowable seat, and may be retracted to a seat floor side or to a side surface side of a vehicle interior in a folded position in a manner that the backrest front surface of the seat back S21 is brought into contact with the seating surface of the seat cushion S22.

A seat back frame 31 of the vehicle seat S2 does not provide the pressure receiving member 20 in order to be formed into a stowable thin profile. Instead, the seat back frame 31 has a structure in which a cushion material 34 is supported from behind by a plurality of extendable or deformable wires 32 suspended between side frames 36, 36. In addition, side frame sections 39, 39 are only provided to the side frames 36, 36 composed of a pipe shaped member. The seat back frame 31 differs in the above-described ways from that of the first embodiment.

As shown in FIG. 7, the side frames 36, 36 provide flat sections 36a, 36a formed by substantially flattening respective portions of the pipe shaped members opposed to each other. In the portion where the flat section 36a is formed, a cross section of the pipe shaped member is substantially flattened in part to be formed into a substantially semicircular hollow shape in cross section. Areas protruded from the right and left side frame sections to a direction along which the side frame sections 36, 36 are opposed to each other are reduced because of the flat sections 36a, 36a, and thus the distance between the side frames 36, 36 are broadened without changing lateral dimensions of the seat back frame 31. In this way, a clearance $t_{11}$ between an inner side of the side frames 36, 36 and a lateral side of the occupant C can be widened. Accordingly, the resistance to the occupant C acting when the occupant C sinks into the seat back S21 can be reduced, and smoother sinking of the occupant C from the backrest front surface is realized.

On the other hand, in the cushion material 34 which is disposed to cover a backrest front surface side, and both right and left sides of the seat back frame 31, core cavity sections 38, 38 are formed in a part of the deformation resistance regions located on the backrest front surface side of the side frames 36, 36, to make a thickness $t_{22}$ of the cushion material 34 smaller. By forming the core cavity sections 38, 38, the resistance to deformation of the cushion material 34 in the deformation resistance regions are reduced and thereby smoother sinking of the occupant C into the seat back S21 from the backrest front surface is realized.

A distance between the side frames 36 and 36 is broadened by the flat sections 36a, 36a for securing a clearance $t_{11}$ between each inner side of the side frames 36, 36 and the occupant C, and thereby deformation of the cushion material 34 is facilitated. In addition, with the core cavity sections 38, 38, the thickness $t_{22}$ of the cushion material 34 in the region to be deformed during sinking motion is reduced, and thereby deformation of the cushion material 34 is facilitated. As such, by forming the core cavity sections 38, 38 on the backrest front surface side of the flat sections 36a, 36a, the resistance to deformation of the cushion material 34 can further be reduced effectively, and smoother sinking of the occupant C into the seat back S21 from the backrest front surface is realized.

Even in a structure provided with either one of the flat sections 36a, 36a and the core cavity sections 38, 38, respective effects of the sections can be, of course, obtained in either case. Meanwhile, in this embodiment, the flat sections 36a, 36a may be formed along with the shape of the back of the occupant C as shown in FIG. 5.

According to the vehicle seat S2 of this embodiment, the flat sections 36a, 36a can be provided almost all over the side frames 36, 36 in the vertical direction, and thereby smoother sinking of the entire back of the occupant C into the vehicle seat S2 is realized. In addition, great effects can be expected by providing the flat sections 36a, 36a or the core cavity sections 38, 38 to the side frames 36, 36 or the cushion material 34 only in the area located in the vicinity of the place corresponding to the chest region or the shoulder region of the occupant C.

According to the vehicle seat S2 of this embodiment, the functions and effects almost identical to those of the first embodiment can be obtained even in the stowable seat. As such, the structure of these embodiments is free from an increase in the number of parts or upsizing of components, and can preferably be applied also to the stowable seat requiring weight and/or thickness reduction.

EXPLANATION OF REFERENCE CHARACTERS

C occupant
S1, S2 vehicle seat
S11, S21 seat back
S12 S22 seat cushion
HR headrest
F seat frame
$t_1$, $t_1'$, $t_{11}$ clearance
$t_2$, $t_{22}$ thickness of cushion material
1, 31 seat back frame
2 seating frame
4, 34 cushion material
5 skin material
8, 38 core cavity section
9, 39 side frame section
11 reclining mechanism
12, 36 side frame
15, 35 upper frame
16 side section
16a, 26a, 36a flat section
17 lower frame
18 pillar supporting section
20 pressure receiving member
21, 32 wire

What is claimed is:

1. A vehicle seat comprising:
a seat back and a headrest attached to the seat back, wherein the seat back comprises:
a seat back frame comprising:
a pair of side frame sections which are respectively comprised of pipe shaped members at least in part, spaced apart from each other in a lateral direction, and extended in a vertical direction, wherein each of the pair of the side frame sections comprises a flat section comprising a deformed region of one of the pipe shaped members opposed to the other of the pipe shaped members, to reduce a thickness of the pair of the side frame sections; and
an upper frame for coupling upper sides of the pair of side frame sections;
the seat back further comprising:
a cushion material disposed at least on a front side of the seat back frame;
wherein:
a core cavity section formed by removing a portion of the cushion material opposed to the side frame section is formed in a region of the cushion material located on a front side of the side frame section;
a thickness of a region of the cushion material in which the core cavity section is formed is smaller than a thickness of another region of the cushion material for supporting a back of an occupant who is seated on the vehicle seat;
the core cavity section comprises an unsupported region at a seat center side of the flat section of the pipe shaped member in which a surface of the core cavity section is not supported by any member for a majority of the core cavity section including a center portion of the core cavity section;
the cushion material is provided with a thin-walled portion that is thinner than other portions of a region of the cushion material where the core cavity is formed, wherein the thin-walled portion is structured as a hinge about which the center portion of the core cavity deforms; and
the flat section of the pipe shaped member and the thin-walled portion of the cushion material are aligned with each other in a front-to-rear direction of the seat.

2. The vehicle seat according to claim 1, wherein the flat section is formed at least in a place generally corresponding to a chest region or a shoulder region of the occupant who is seated on the vehicle seat.

3. The vehicle seat according to claim 1, wherein the core cavity section is formed at least in an area opposed to a region of the side frame section in which the flat section is formed.

4. The vehicle seat according to claim 1, wherein the flat sections are angled toward mutually opposite directions relative to a back and forth direction of the vehicle seat in such a manner that a distance between front ends of the opposing flat sections becomes greater than a distance between back ends of the opposing flat sections.

5. The vehicle seat according to claim 1, further comprising:
a pressure receiving member disposed behind a center region of the cushion material,
wherein:
right and left core cavity sections are respectively formed in respective regions of the cushion material located on respective front sides of the respective side frame sections; and
respective right and left ends of the pressure receiving member are located proximate the respective right and left core cavity sections, but are closer to a seat center than the respective right and left core cavity sections.

* * * * *